United States Patent
Dhong et al.

(10) Patent No.: US 7,392,270 B2
(45) Date of Patent: Jun. 24, 2008

(54) APPARATUS AND METHOD FOR REDUCING THE LATENCY OF SUM-ADDRESSED SHIFTERS

(75) Inventors: Sang Hoo Dhong, Austin, TX (US);
Christian Jacobi, Boblingen (DE);
Silvia Melitta Mueller, Altdorf (DE);
Hiroo Nishikawa, Shiga (JP);
Hwa-Joon Oh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 10/902,475

(22) Filed: Jul. 29, 2004

(65) Prior Publication Data

US 2006/0026223 A1 Feb. 2, 2006

(51) Int. Cl.
*G06F 7/00* (2006.01)
*G06F 7/38* (2006.01)

(52) U.S. Cl. .................................. 708/209; 708/501

(58) Field of Classification Search ................ 708/209, 708/501
See application file for complete search history.

(56) References Cited

U.S. PATENT DOCUMENTS

| | | | |
|---|---|---|---|
| 5,790,444 A * | 8/1998 | Olson et al. | 708/501 |
| 5,957,997 A * | 9/1999 | Olson et al. | 708/205 |
| 6,529,924 B1* | 3/2003 | Nowka | 708/209 |

* cited by examiner

*Primary Examiner*—Chuong D Ngo
(74) *Attorney, Agent, or Firm*—Francis Lammes; Stephen J. Walder, Jr.; D'Ann N. Rifai

(57) ABSTRACT

The present invention provides for calculating a shift amount as a function of a plurality of numbers. At least one decoder and the at least one adder are coupled in parallel. A shifter is configured to compute a value in a plurality of shift stages, and wherein a bit group of the shift amount is employable to affect at least one of the plurality of shift stages, thereby decreasing processing time.

10 Claims, 4 Drawing Sheets

*FIG. 3A*
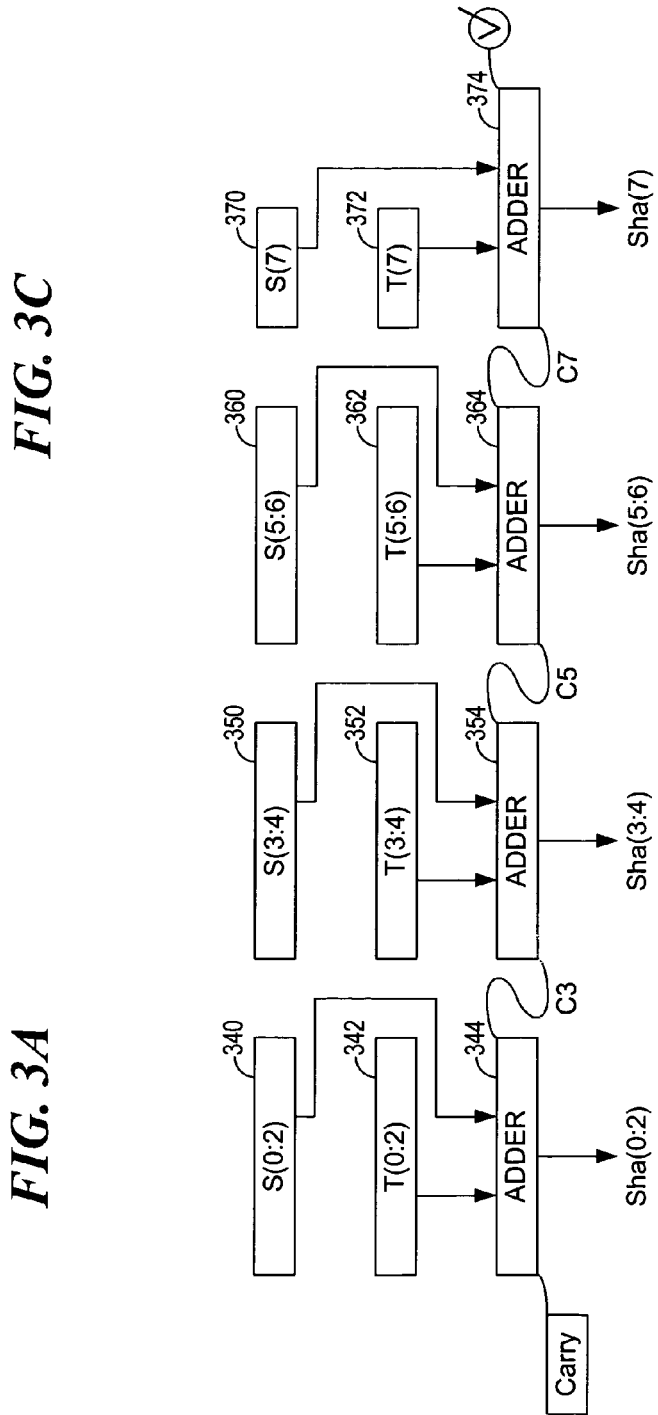
*FIG. 3C*
*FIG. 3B*

APPARATUS AND METHOD FOR REDUCING THE LATENCY OF SUM-ADDRESSED SHIFTERS

TECHNICAL FIELD

The present invention relates generally to shifters and, more particularly, to sum-addressed shifters.

BACKGROUND

In data processing, there are various devices employed for the manipulation of numbers and data. One of these devices is a "floating point unit" (FPU), which is typically used to add and multiply floating point numbers to one another. There are complexities, however, to designing and operating an FPU. One such problem concerns the alignment of numbers. For numbers to be added, they should be expressed in a form that is easy to add to one another, with additional exponent information. For instance, if the number 11100011 with exponent value 3 were to be added to 11000111 with an exponent value of −2, the two numbers would be added as follows. The first number used is extended on the least significant digit by 5 zeroes before it can be added to the second number.

In FPUs, featuring a fused-multiply-add instruction, three floating point operands A, B and C are combined to one result, "R" by R=A*B+C. Other, operations, such as multiplication or addition, are obtained by forcing C=0 or A=1, respectively. The floating point operands are given in IEEE format. In this format, every number has a sign bit, an exponent and a fraction, which shall be designated $s_a$, $e_a$, $f_a$, for operand A, respectively. $S_b$, $e_b$, $b_f$, $s_c$, $e_c$ and $f_c$ for operands for B and C, respectively. The value of A is given by $((-1)s_a * 2e_a * f_a)$, for example. The product of A and B is denoted P, which consists of $s_p$, $e_p$, and $f_p$.

One of the central components of such FPU designs is the alignment shifter, which aligns the fraction of operand "c" to the fraction of the intermediate product "P" with respect to the exponents of C and P. This alignment shift yields an alignment of the binary points of C and P before these two numbers are added. For this alignment, the fraction $f_c$ is shifted. A shift amount "sha" is computed as sha=$e_a$+$e_b$−$e_c$+constant. The constant arises as a matter of system design. If the shift amount is in a given range, the alignment is performed by an actual shifter. If the shift amount is outside of a given range, these other cases are handled as "special" cases, that is, the shift amount (sha) underflow and overflow, respectively.

Generally, in a conventional multiply-add FPU, there are three exponent numbers that are added. These three numbers generate in turn, two numbers, which are in turn added by a 2:1 adder, thereby producing a shift amount. In conventional technology, the shift amount ("sha") is sent to decoders, such as a 1b decoder, a 2b decoder, and a 3b decoder. These decoders then determine the number of bits by which the fractional part of the addend, the fraction $f_c$, is to be shifted. Typically, the shift is broken up into several shift stages.

However, there are problems associated with this technology. Specifically, the shift amount adders and decoders are both on the timing-critical path of the aligner.

Therefore, there is a need for an aligner that addresses at least some of the issues associated with conventional aligners.

SUMMARY OF THE INVENTION

The present invention provides for calculating a shift amount as a function of a plurality of numbers. At least one decoder and the at least one adder are coupled in parallel. A shifter is configured to compute a value in a plurality of shift stages, and wherein a bit group of the shift amount is employable to affect at least one of the plurality of shift stages.

BRIEF DESCRIPTION OF THE DRAWINGS

For a more complete understanding of the present invention, and the advantages thereof, reference is now made to the following Detailed Description taken in conjunction with the accompanying drawings, in which:

FIG. 3A illustrates an addition of a shift amount;

FIG. 3B illustrates the shift-amount addition broken down into bit groups, and the adding of the bit-groups;

FIG. 3C illustrates the interface of a reduced carry network; and

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
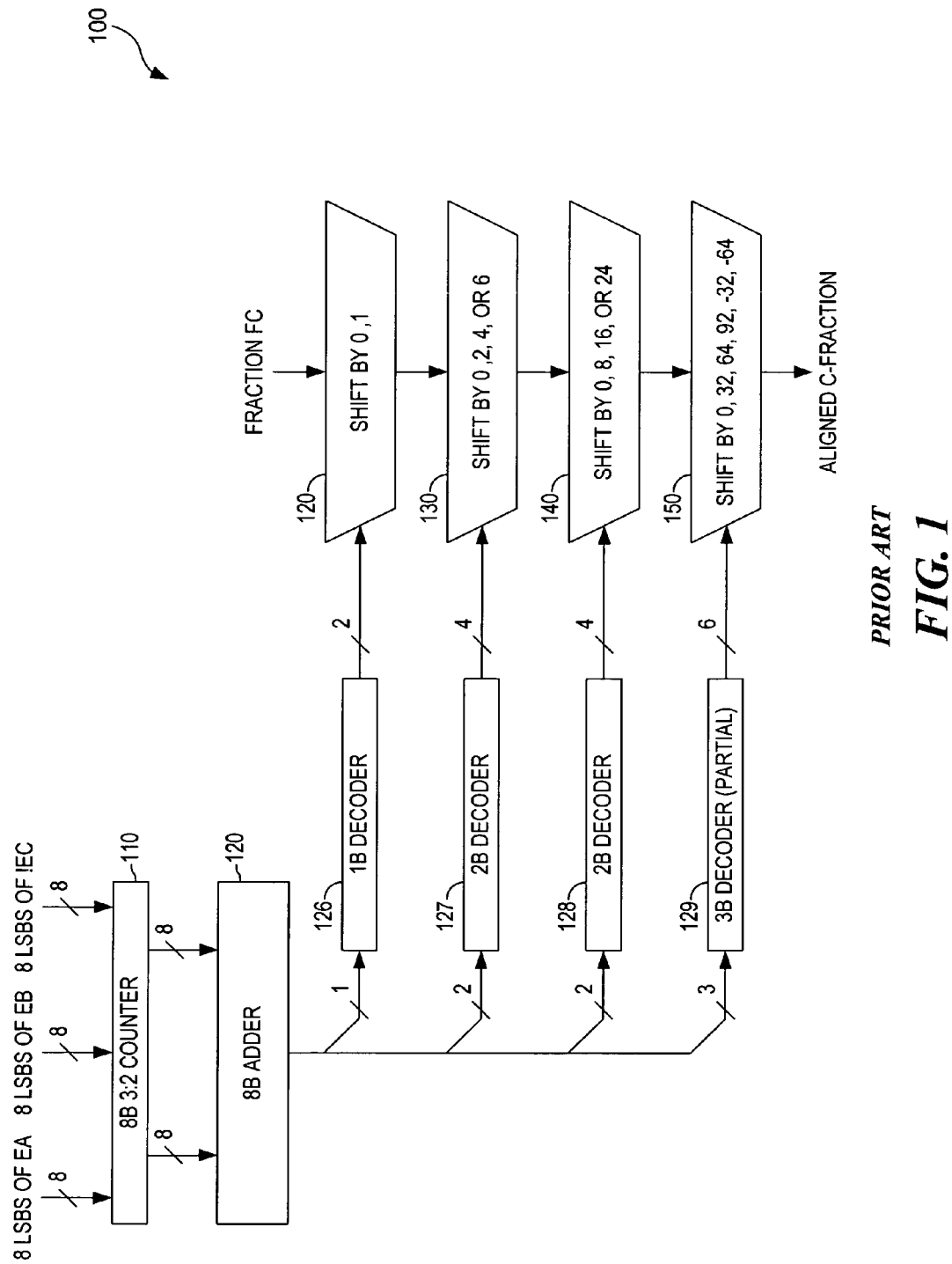
FIG. 1 schematically depicts a prior art double precision aligner.

Turning to FIG. 1, illustrated is a core of a double precision prior art FPU aligner 100. The LSB of the inputs, $E_a$, $E_b$, and $E_c$ are fed into a 3:2 counter 110. From the 3:2 counter 110, two numbers are generated and input into an 9 bit adder 120. The outputs of the 8 bit adder 120 are coupled to decoders 126-129. Each of these decoders looks at a separate part of the output of the 8B adder 120. Then, each of the decoder outputs a signal to a shifter 120-150, respectively. If the decoder indicates it, the fraction part of the C values is shifted over by a certain value, such as 0, 1 in a first stage, a 0, 2, 4, 6 in a second stage, and so on.

The exponents $e_a$, $e_b$, and $e_c$ are combined in a 3:2 counter. The intermediate results S and T are a carry-save redundant form of sha, that is s+t equals $e_a$+$e_b$−$e_c$+1 modulo 256. In the system 100, −$e_c$+1 equals NOT($e_c$). S and T are fed into the adder 120, producing the two's complement representation of sha, This representation is then decoded piecewise, to hot-one select-signals, which control the multiplexers 120-150 which performs the actual shift amount $f_c$. In the system 100, the shifter is composed of four stages. First shifter stage 120 shifts by 0 or 1 place, the second shifter stage 130 by 0, 2, 4, or 6 places, the third shifter stage 140 by 0, 8, 16 or 24 places, and the fourth shifter stage by 0, 32, 64, 92, −32 or −64. These constants are typically design dependent, such as the partitioning of the alignment shifters.

Figure 2:
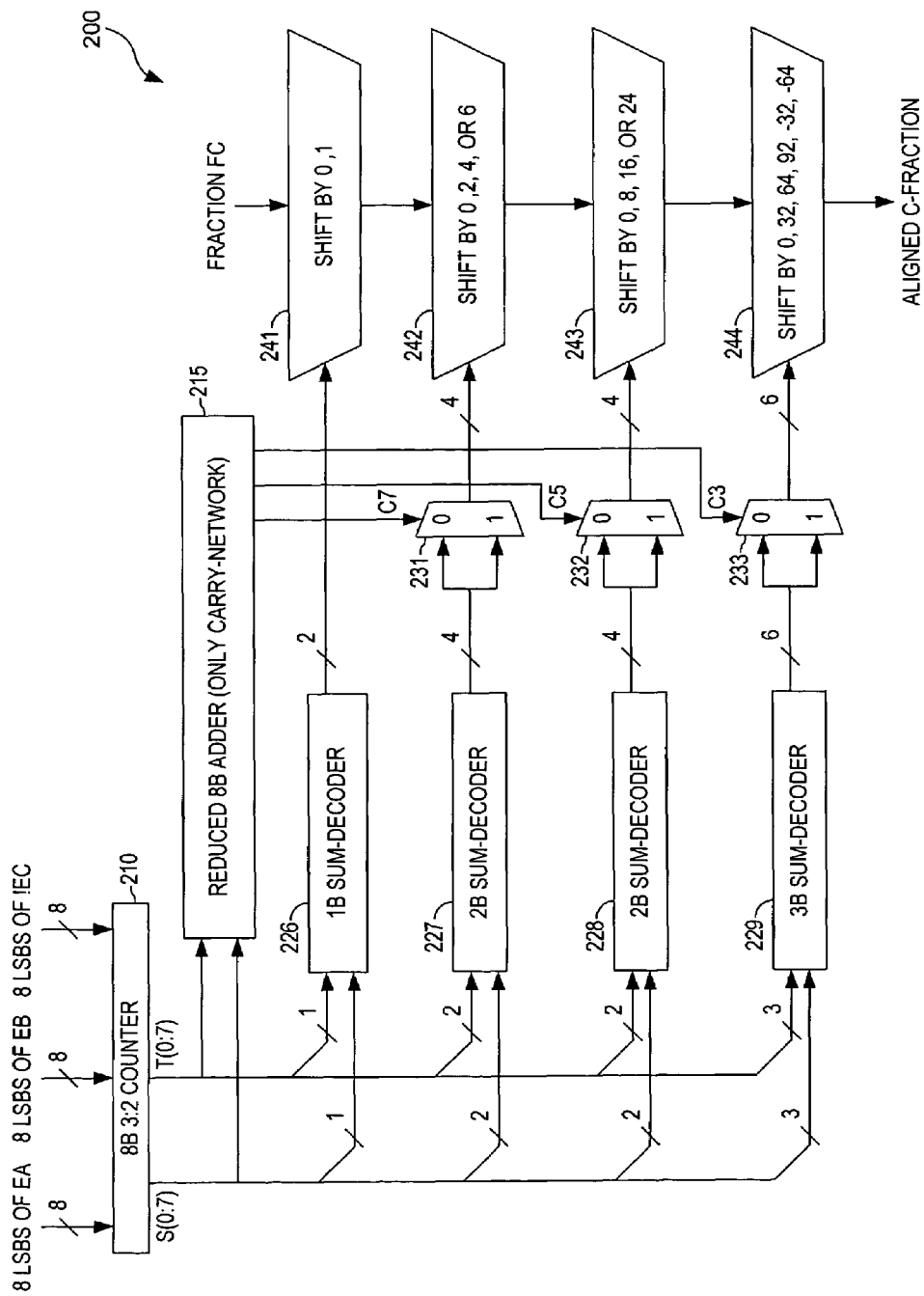
FIG. 2 illustrates a double precision sum-addressed aligner.

Turning now to FIG. 2, illustrated is a core of a double precision sum-addressed alignment shifter 200, wherein the 8-bit exponent adder has been removed from the path between the 3:2 counter 110 and the decoders 126-129. Instead, the FPU 200 computes the multiplexer select signals directly from s and t.

In the system 200, a 3:2 counter 210 is coupled to a reduced 8b carry adder 215. The 3:2 counter 210 is also coupled to decoders 226-229. The carry outputs of the reduced 8b adder are block carry signals only. Each of the carry bits are then coupled to a multiplexer 231-233. These multiplexers 231-233 rotate the output of the decoders 226-229 by one bit, depending upon whether the carry bit is a 1 value or a 0 value. The output of these multiplexers are then inputted into four shifter stages 241-244, and the signal from the 2B sum decoders 226-229 indicates whether a shift should occur or not. These are the hot one select signals.

In the following notation, if there is a bit index, the bit index 0 is the most significant bit. An index is sequential, and the higher the index number the less significant the bit. In the FPU aligner 200, the two vectors S and T are partitioned into segments, and the aligner computes the unary decode of the sum of S and T for each of the segments. In the system 200, the sum of s and t for the bit 7 for the first multiplexer stage 241 are decoded, bits 5:6 for the second stage 242 are decoded. Also, bits 3:4 for the third stage 243. Finally, bits 0:2 for the fourth stage of the multiplexer 244 are decoded.

For example, for the third stage sum decoder 228, it is determined whether the 2-bit sum s(3:4)+t(3:4) equals 0, 1, 2 or 3, which corresponds to a shift-amount of 0, 8, 16, or 24, according to the weight of these bits in the complete sum. This decode is done independently of any carry-bits which have to be propagated from low-order to high-order bits of the complete sum by the reduced 8b adder only carry network 215. Hence, this decoding is only approximate and has to be corrected in step 3 below.

The question whether s(3:4)+t(3:4) is 0, 1, 2 or 3 can easily be decided in hardware. A small circuit with 4 input bits s(3:4) and t(3:4), and 4 output bits indicating whether s(3:4)+t(3:4) is 0, 1, 2, or 3 can be derived from a truth-table with 16 entries, for example. This truth-table is exemplarily shown in Table 1.

TABLE 1

| s(3:4) | t(3:4) | s(3:4) + t(3:4) | decode (0) | decode (1) | decode (2) | decode (3) |
|---|---|---|---|---|---|---|
| 00 | 00 | 0 | 1 | 0 | 0 | 0 |
| 01 | 00 | 1 | 0 | 1 | 0 | 0 |
| 10 | 00 | 2 | 0 | 0 | 1 | 0 |
| 11 | 00 | 3 | 0 | 0 | 0 | 1 |
| 00 | 01 | 1 | 0 | 1 | 0 | 0 |
| 01 | 01 | 2 | 0 | 0 | 1 | 0 |
| 10 | 01 | 3 | 0 | 0 | 0 | 1 |
| 11 | 01 | 4 = 0 mod 4 | 1 | 0 | 0 | 0 |

TABLE 1-continued

| s(3:4) | t(3:4) | s(3:4) + t(3:4) | decode (0) | decode (1) | decode (2) | decode (3) |
|---|---|---|---|---|---|---|
| 00 | 10 | 2 | 0 | 0 | 1 | 0 |
| 01 | 10 | 3 | 0 | 0 | 0 | 1 |
| 10 | 10 | 4 = 0 mod 4 | 1 | 0 | 0 | 0 |
| 11 | 10 | 5 = 1 mod 4 | 0 | 1 | 0 | 0 |
| 00 | 11 | 3 | 0 | 0 | 0 | 1 |
| 01 | 11 | 4 = 0 mod 4 | 1 | 0 | 0 | 0 |
| 10 | 11 | 5 = 1 mod 4 | 0 | 1 | 0 | 0 |
| 11 | 11 | 6 = 2 mod 4 | 0 | 0 | 1 | 0 |

In parallel to the decoding performed by the sum decoders 226-229, the carry-network computes signals which indicate whether carries had to be propagated over the cutting points if s and t would be added over the complete 8-bit width. This can be computed using a fast carry-lookahead network, for example. In the system 200, the carry network computes whether in a true addition of s and t, s(7)+t(7) produces a carry into bit 6 of the addition. This information will be needed in s(3:7)+t(3:7) to correct the select signals computed from bits 5:6. S(5:7)+t(5:7) would produce a carry into bit 4 of the addition. This will be used for the correction of the select signals computed from bits 3:4. S(3:7)+t(3:7) would produce a carry into bit 2, needed for correction of bits 0:2.

In the system 200, for the correction bits the full sum of s and t, from bit 7 (the least significant digit) up to the cutting point, is considered. The system 200 denotes the carry bits computed in c7, c5, and c3, respectively. In the third step of the select-signal computation, the pre-decoded signals from above are corrected using the carry signals from step 2. By the definition given above, $$sha(0:7)=s(0:7)+t(0:7),$$

hence $$sha(7)=s(7)+(7),$$

$$sha(6:5)=s(5:6)+t(5:6)+c7 \bmod 4$$

$$sha(3:4)=s(3:4)+t(3:4)+c5 \bmod 4$$

$$sha(0:2)=s(0:2)+c3 \bmod 8.$$

Above, the unary decodes of the partial sums ignoring c7, c5, and c3 respectively, has been computed. This can now be corrected by simply rotating each of the decoded masks by one position if the corresponding carry-signal is 1 (effectively meaning a unary modulo-addition of c7, c5, or c3, respectively, to the unary decoded partial sums).

The described approach has at least the following advantages: The decoding and the computation of the carry-signals can be done in parallel. The correction step involves only one multiplexer. Hence, this scheme is faster then first computing the complete sum of s and t, and later do the piecewise decoding of the shift-amount. Furthermore, in contrast to a complete adder, only the carry bits for the 3 cut-points have to be computed. Only computing the carry bits reduces hardware cost for the adder on the exponent logic.

The system 200 type of approach, which computes the alignment shift amount, does also work for FPU designs which only support add instructions instead of fused-multiply-add. This approach also does work for FPU designs which support other precisions, not just double precision. Also, this approach is not limited to designs where the shift amount is computed from exactly 8 bits of the exponents, or to the exact cut-points for the partial decodes. In the system 200, the actual shift amount sha should be computed as sha=ea+eb+!ec+2 mod 256, where the +2 stems from a constant. The constant shift by 2 places is done before the first mux without the employment of any logic circuits. Alternatively, the constant shift could be integrated in one of the shift stages because there is a constant of 2. Other designs can have a different constant.

Turning now to FIG. 3A, illustrated is an addition of a shift amount. The s value 310 and the t value 320 are added to create a shift amount "sha" 325 and a carry out value 330.

Turning now to FIG. 3B, the s value of 0 through 7 has been broken down into bit groups. For example, bits 0-2 340, bits 3-4 350, bits 5-6 360, and the bit 370 are various bit groups. The t values 0 through 7 have been broken down into bits 0-2 342, bits 3-4 352, bits 5-6 362, and the bit 7 372, each aggregation corresponding to a bit group. These bit groups of the s and t value are added by an adder 344, 354, 364 and 374, respectively, thereby creating a group carry signal c3, a c5, and a c7. They also generate a sha(0:2), a sha (3,4), a sha (5:66), and a sha(7) value. These values are portions of bit groups related to the shift amounts.

Turning now to FIG. 3C, the reduced carry network 380 generating c3, c5, c7 is used by the carrier of FIG. 2. The system 200 carries the values after the decoding.

Figure 4:
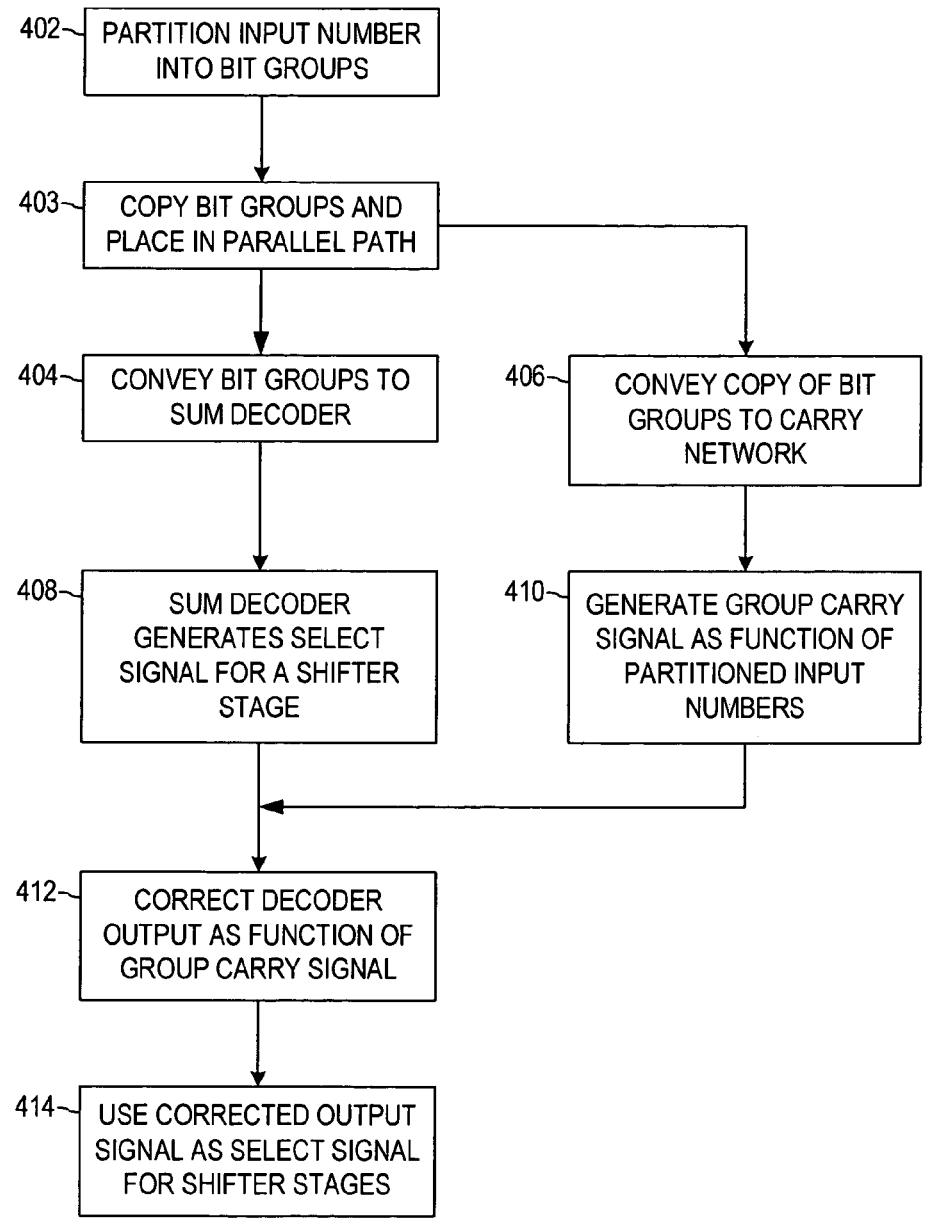
FIG. 4 is a flow chart illustrating a method for calculating a shift amount.

Turning now to FIG. 4, the reference numeral 400 generally indicates a method for calculating a shift amount. In step 402, a plurality of input numbers is partitioned into two or more bit groups each. In step 403, the partitioned numbers are copied and are broken up into two separate parallel paths in different parts for processing. In step 404, the bit groups are conveyed to a plurality of sum decoders. In parallel to step 404, in step 406, the bit groups are copied to a carry network. In step 408, a sum decoder is used to generate a select signal or a set of select signals for one of a number of shifter stages. In step 410, in parallel, a group carry signal is generated as a function of the partitioned input numbers. In step 412, a decoder output is corrected as a function of the group carry signal as received from both step 408 and step 410. In step, 414, the corrected output signal is used as a select signal for shifter stages.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments.

Accordingly, it is appropriate that the appended claims be construed broadly and in a manner consistent with the scope of the invention.

The invention claimed is:

1. A method, in a data processing device, for calculating a decoded shift amount to reduce latency of a hardware shifter, comprising:

partitioning a plurality of input numbers into a plurality of bit groups;

conveying the plurality of bit groups to at least one hardware sum decoder, wherein the plurality of bit groups of each of the plurality of input numbers gets distributed over the at least one hardware sum decoder and wherein the at least one hardware sum decoder gets one of the plurality of bit groups from each of the plurality of input numbers;

conveying a copy of the plurality of bit groups to a carry network;

employing the at least one hardware sum decoder to decode at least one decoded shift amount for one of a plurality of shifter stages;

generating a plurality of group carry signals as a function of the copy of the plurality of bit groups;

correcting the at least one decoded shift amount from the at least one hardware sum decoder as a function of the group carry signals thereby forming a corrected output signal; and employing the corrected output signal as a select signal in a set of select signals for one of the plurality of shifter stages in the hardware shifter wherein the plurality of shift stages compute a value using the set of select signals thereby reducing the latency of the hardware shifter and wherein the value is used to shift a fraction of an operand by the value so that the operand aligns with a fraction of an intermediate product.

2. The method of claim 1, further comprising decoding the decoded shift amount without first computing a binary version of the decoded shift amount.

3. The method of claim 1, wherein the decoded shift amount is calculated as a function of three numbers.

4. The method of claim 1, wherein the decoding further comprises employing a 1 bit hardware sum decoder.

5. The method of claim 1, wherein the decoding further comprises employing a 2 bit sum hardware decoder.

6. The method of claim 1, wherein the decoding further comprises employing a 3 bit sum hardware decoder.

7. The method of claim 1, wherein at least one hardware adder is employed by the carry network to generate the plurality of group carry signals.

8. The method of claim 7, wherein the at least one hardware adder is an 8 bit hardware adder.

9. The method of claim 1, wherein the at least one decoded shift amount is corrected using at least one hardware multiplexer.

10. The method of claim 9, wherein the at least one hardware multiplexer rotates the at least one decoded shift amount by one bit.

* * * * *